United States Patent [19]

Blankenship

[11] 4,344,670
[45] Aug. 17, 1982

[54] OPTICAL WAVEGUIDE SOOT PREFORM WITH REDUCED INNER LAYER STRESS AND METHOD OF MAKING

[75] Inventor: Michael G. Blankenship, Corning, N.Y.

[73] Assignee: Corning Glass Works, Corning, N.Y.

[21] Appl. No.: 145,445

[22] Filed: May 1, 1980

[51] Int. Cl.³ .......................................... G02B 5/172
[52] U.S. Cl. ................................. 350/96.31; 65/3.11
[58] Field of Search ............. 350/96.31, 96.30, 96.29; 65/120, 3.11, 30.13, 111

[56] References Cited

U.S. PATENT DOCUMENTS

| | | | |
|---|---|---|---|
| 3,676,043 | 7/1972 | Anderson et al. | 431/93 |
| 3,806,570 | 4/1974 | Flamenbaum et al. | 264/66 |
| 3,823,995 | 7/1974 | Carpenter | 350/96.31 |
| 3,826,560 | 7/1974 | Schultz | 350/96.31 |
| 3,933,454 | 1/1976 | DeLuca | 65/3 |
| 4,125,388 | 11/1978 | Powers | 65/3.2 |
| 4,165,223 | 8/1979 | Powers | 65/2 |
| 4,173,305 | 11/1979 | Blankenship | 239/79 |

FOREIGN PATENT DOCUMENTS 1521826  8/1978  United Kingdom .
2004863  4/1979  United Kingdom .

OTHER PUBLICATIONS

"Material Structure of Germanium-Doped Optical Fibers and Preforms," H. M. Presby et al., *Bell System Technical Journal*, 54(10), pp. 1681–1692, (Dec. 1975).

*Primary Examiner*—John K. Corbin
*Assistant Examiner*—Frank Gonzalez
*Attorney, Agent, or Firm*—Kees van der Sterre

[57] ABSTRACT

A process for making a tubular optical waveguide preform for a high-numerical-aperture optical waveguide which comprises an inner compression layer for enhanced preform strength, and a soot preform produced in accordance with the process, are described.

10 Claims, 3 Drawing Figures

OPTICAL WAVEGUIDE SOOT PREFORM WITH REDUCED INNER LAYER STRESS AND METHOD OF MAKING

BACKGROUND OF THE INVENTION

The present invention relates to the manufacture of glass optical waveguide preforms or blanks by the doped deposited silica process and particularly to an improvement in the known outside vapor phase oxidation (OVPO) process whereby more durable optical waveguide blanks for high numerical aperture graded-index glass waveguides can be made.

U.S. Pat. Nos. 3,823,995 and 3,826,560 describe the manufacture of glass optical waveguides from silica and doped silica of high purity by depositing concentric layers of these materials on suitable tubular or cylindrical substrates and working the layered structures into optical waveguide filaments. In the process known as the outside or OVPO process, an optical waveguide blank is built up on a rotating, substantially cylindrical bait rod or mandrel by depositing layers of pure or doped silica glass in soot form thereon, the glass soot being vitreous (amorphous) and being produced by the flame oxidation of combustible volatile compounds of silicon, boron, germanium, phosphorus or the like. After the soot layers have been deposited, the mandrel is removed from the soot preform and the preform is then dried to remove water introduced during the deposition process, consolidated to a clear glass tubular preform, and drawn into an optical waveguide filament. A number of patents describing the manufacture of doped silica optical waveguides by the OVPO process have issued, and the representative patents, in addition to those noted above, include U.S. Pat. Nos. 3,806,570, 3,868,170, 3,933,454, 4,125,388, 4,165,223 and 4,173,305.

In the outside process the first-deposited layers will form the central core of the waveguide after the mandrel is removed and the soot blank or preform consolidated and drawn into a waveguide filament. For graded-index waveguides, these layers must have a higher refractive index than subsequently deposited layers so that the radial refractive index profile of the core will conform to the desired parabolic form needed for low light pulse dispersion in the waveguide.

The requirement for high refractive index at the central core means that the first-deposited layers will contain higher levels of refractive-index-increasing dopants, and will ordinarily exhibit higher coefficients of thermal expansion, than the subsequently deposited layers of the core. The highest expansion, innermost layer of the preform immediately adjacent to the mandrel is exposed when the mandrel is withdrawn from the preform, and forms the inner surface of the longitudinal preform center hole. This layer is in tension at ambient temperatures, due to its high expansion coefficient with respect to the remaining layers of the preform, and promotes crack propagation into the body of the preform. Especially with preforms for high numerical aperture (NA) waveguides, containing highly doped, high expansion cores, there is a substantial risk of breakage from center hole tension during the manufacture and subsequent handling of the preform, particularly after the soot preform has been consolidated to a clear tubular glass preform.

U.K. Patent Specification No. 1,521,826 includes an explanation of the problem of center hole stress in tubular optical waveguide preforms, and suggests the use of $P_2O_5$ in combination with $GeO_2$ as core dopants which can alleviate the problem of excessive core thermal expansion. Another proposed solution, outlined in published U.K. Patent Application No. 2,004,863, involves the use, in the outer core layers of the preform, of a dopant which increases thermal expansion without increasing refractive index. An example of such a dopant is $B_2O_3$.

Although this latter procedure had been successfully used to make relatively high-numerical-aperture, graded index optical waveguides with high bandwidth, having NA values on the order of about 0.2, still higher numerical aperture values are desirable for some waveguide applications. Unfortunately, the use of larger quantities of $B_2O_3$ in the peripheral core and cladding to reduce stresses at the inner surface of the consolidated glass preform is accompanied by undesirable reductions in viscosity in the $B_2O_3$-containing glass, causing difficulties in implementing the preform collapse and filament drawing steps of manufacture.

It is therefore a principal object of the present invention to provide an alternative method for making preforms for high-numerical-aperture glass optical waveguides, useful alone or in combination with previous methods, which method greatly facilitates the manufacture of graded index optical waveguides having numerical aperture values greater than about 0.2.

It is a further object of the invention to provide a cylindrical optical waveguide soot preform made up of a plurality of layers of vitreous soot and incorporating a longitudinal center hole left by the removal of the starting member or mandrel which can be consolidated to a clear glass tubular preform exhibiting improved resistance to breakage during the subsequent steps of waveguide fabrication.

Other objects and advantages of the invention will become apparent from the following description thereof.

SUMMARY OF THE INVENTION

In one aspect, the present invention comprises an improvement in the conventional outside process for making a cylindrical optical waveguide preform of the graded index type. As previously noted, the initial step of this conventional process is to apply to the exterior cylindrical surface of a cylindrical starting member a plurality of concentric layers of vitreous soot, with the composition and refractive index of the glass making up the soot being varied radially such that the layers proximate to the starting member i.e., the inner core layers, contain relatively high concentrations of refractive-index-increasing dopants in comparison to later-applied layers, positioned radially outward or exteriorly of the inner core layers and forming the outer core and cladding. In the conventional preform, the inner core layers proximate to the starting member contain the highest quantities of refractive-index-increasing dopants and are ordinarily in the highest state of tensile stress, with the first-applied layer being the most highly doped and exhibiting the highest tensile stress in the preform.

In accordance with the process improvement of the invention, the tensile stress in at least the first applied layer is reduced by modifying the composition of the layer to reduce the thermal expansion coefficient thereof to a value below that of at least one of the subsequently applied core layers. This reduction in tensile stress in the first applied layer reduces the likelihood that flaws present in the layer after removal of the starting member from the preform and consolidation of the soot to clear glass will initiate breakage of the preform during subsequent handling and processing.

In a second aspect, the invention comprises a substantially cylindrical optical waveguide soot preform which can be consolidated to a clear glass tubular preform with a reduced likelihood of breakage after consolidation. For the purpose of the present description a soot preform is a preform as it exists following soot deposition but prior to any treatment to remove residual water or to consolidate the preform to clear glass.

The soot preform of the invention has a radially varying composition and comprises a plurality of concentric layers of vitreous soot including an inner layer defining the surface of the longitudinal center hole of the preform. The core soot layers proximate to the inner layer of the preform contain relatively high concentrations of refractive-index-increasing dopants and are tensilely stressed, but the inner layer itself, defining the center hole of the preform, exhibits a reduced level of tensile stress in comparison to the highly doped core layers proximate thereto. The inner layer has a composition differing from that of these adjoining inner core layers, and exhibits reduced tensile stress because its thermal expansion coefficient is lower than the expansion coefficients of the highly doped core layers located in proximity thereto. These composition and stress characteristics are carried over into the consolidated preform, and are responsible for the enhanced physical durability exhibited thereby. For the purposes of the present description, reduced tensile stress encompasses the cases of lower tensile stress, zero stress, and compressive stress in the inner layer.

DESCRIPTION OF THE DRAWING

The invention may be further understood by reference to the drawing, wherein.

DETAILED DESCRIPTION

Figure 1:
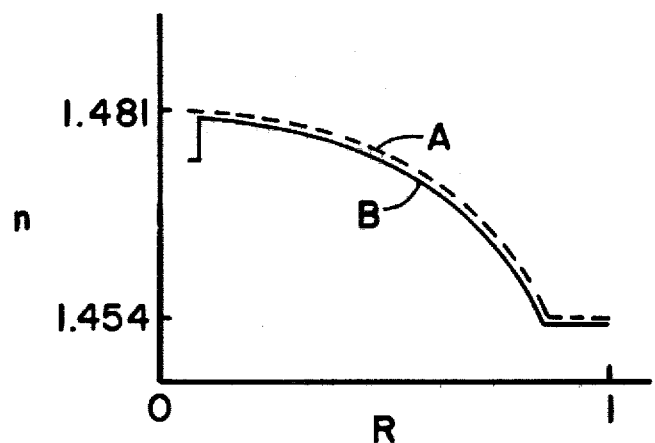
FIG. 1 schematically compares target refractive-index profiles for a consolidated conventional high NA optical waveguide preform and a consolidated high NA optical waveguide preform provided according to the invention.

Inner layer composition adjustments to obtain thermal expansion and tensile stress reductions in the inner layer of the preform in accordance with the invention may of course be used as the only preform stress reduction technique, if desired. However, the invention is preferably used in combination with other methods for controlling stress, such as the use of specific core dopant combinations which reduce overall core expansion, or the use of outer core/cladding composition adjustments which reduce compressive stress in the outer portions of the preform.

The particular composition adjustment used to decrease the expansion coefficient of the inner or first-applied layer according to the invention will depend on the transmission properties required in the waveguide product. Examples of possible adjustments are the addition of refractive-index-increasing, thermal-expansion-reducing dopants, such as $TiO_2$, into the inner layer, or the direct reduction of the amount of refractive-index-increasing dopant in the inner layer, which with most dopants has the direct effect of reducing the thermal expansion of the inner layer.

The preferred stress reduction technique from the standpoint of manufacturing simplicity is that of reducing the dopant concentration of the inner layer. Dopants which increase the refractive index and thermal expansion coefficient of silica and therefore can be used to provide reduced expansion layers at reduced concentrations include $GeO_2$, $P_2O_5$ and combinations thereof. Although other dopants could be used, these are the dopants presently preferred for use in practicing the invention.

As has been recognized in the prior art, particularly in U.S. Pat. No. 4,165,223, conventional soot preform drying and consolidation processes can cause substantial dopant volatilization from the central regions of a soot preform. This can result in a considerable departure from the target profile in the consolidated preform and a large reduction in bandwidth in the drawn waveguide filament.

Since the dopant-depleted layers provided according to the invention are introduced into the soot preform during the soot deposition process, and can therefore be closely controlled as to both composition and thickness, control over the extent of bandwidth loss is possible. For waveguide applications wherein good to moderate bandwidth characteristics are required, e.g., bandwidth values of 100 megahertz or greater, it is normally preferred that the thickness of the inner soot layer not exceed about 3% of the total thickness of all of the soot layers deposited for the waveguide core.

The amount of stress reduction obtainable in the thin inner layer will depend upon the extent to which the expansion coefficient of the layer is reduced. In some cases the reduction can be sufficient to reduce the tensile stress in the inner layer to zero or, most preferably, to place the inner layer in a state of compression. A compressively stressed inner layer is particularly effective in enhancing preform strength because the compressive stress in this layer must be overcome by externally applied stresses before crack propagation through the layer and into the tensilely stressed regions of the preform can occur.

The invention may be further understood by reference to the following illustrative example.

EXAMPLE

A theoretical profile for a high numerical aperture ($NA \geq 0.25$) graded index optical waveguide preform, schematically illustrated by the broken line curve marked A in FIG. 1 of the drawing, is computed. This conventional target profile is for a waveguide characterized by a core refractive index gradient corresponding to an alpha-value of about 2.0, an on-axis core refractive index value of 1.481, and a cladding refractive index value of 1.454. To achieve enhanced consolidated preform strength in accordance with the invention, this target profile was modified, as shown by solid line curve B in FIG. 1 of the drawing, by reducing the amount of refractive-index-increasing dopant in the inner core layer. A soot preform was prepared utilizing this modified target profile as follows.

A cylindrical starting member consisting of a fused silica glass tube about 120 cm in length and 0.6 cm in diameter was clamped in a lathe for rotation and translation in front of an OVPO burner designed to provide vitreous pure or doped silica glass soot. The burner was of a type such as described in U.S. Pat. No. 4,125,388, that patent being expressly incorporated by reference herein for a description of the burner and its operation. The burner was supplied via manifolds with the flame gases methane (natural gas) and oxygen, reactant gases consisting of oxygen mixed with $SiCl_4$, $GeCl_4$ and/or $BCl_3$, and inner and outer shield gas oxygen. It was equipped with a cylindrical fused silica draft shield 5.5 cm. in diameter extending 7.5 cm. from the burner face, and was spaced 15 cm from the starting member.

To match the conventional theoretical profile of curve A of FIG. 1 and achieve an on-axis refractive index of 1.481 in the waveguide filament, the glass soot initially applied to the starting member would normally have included about 27% $GeO_2$ by weight. In order to reduce the thermal expansion of the first layer applied to the starting member below that of some of the subsequently applied layers, the target $GeO_2$ content of the first layer was reduced to 22%, with the remainder of the composition consisting of 76% $SiO_2$ and 2% $B_2O_3$ by weight. This reduction reduced the refractive index of the first layer as indicated by the refractive index depression occurring adjacent to the refractive index peak of curve B in FIG. 1 of the drawing.

This first layer and subsequent layers were applied using a reactant gas mixture produced by bubbling dry oxygen through liquid $SiCl_4$ and $GeCl_4$ in containers maintained at 37° C., and from a container of gaseous $BCl_3$ maintained at 30° C. The proportions of mixture constituents were adjusted by controlling $O_2$ and $BCl_3$ flow to achieve the desired soot composition. Apparatus suitable for delivering such a reactant gas mixture is disclosed in copending patent application Ser. No. 872,619, filed Jan. 26, 1978, and that application is expressly incorporated herein by reference for a description of such a delivery system.

The application of the first layer to a thickness of about 0.44 mm was accomplished after about 20 passes or traverses of the starting member past the burner. Soft soot was applied during these passes, to facilitate the later removal of the starting member from the soot preform. This soft soot was obtained by reducing the amount of methane and oxygen supplying the burner flame. The calculated thermal expansion coefficient of the glass of this first layer was about $15 \times 10^{-7}/°C$. at 25° C.

After the first layer had been applied, the composition of the reactant mixture was adjusted to provide a soot composition of about 27% $GeO_2$, 2% $B_2O_3$ and 71% $SiO_2$. A glass of this composition has a thermal expansion coefficient of about $19 \times 10^{-7}/°C$., which is higher than that of the first-applied layer, and has a refractive index of about 1.481, which is equivalent to that required by the aforementioned conventional target profile and which is called for by the modified target profile after the deposition of the first layer has been completed. Thus, as shown in FIG. 1, the modified profile (curve B) rejoins the conventional profile (curve A) and begins to conform to that profile after the first soot layer has been deposited on the preform mandrel.

The remaining layers of the soot preform were thereafter applied in conventional fashion to adhere to the conventional and modified target profiles, with the $GeO_2$ content being gradually reduced from 27% to zero over the remaining thickness of the core layer (totalling about 2.1 cm), and with the $B_2O_3$ content being increased rapidly from about 2% to about 16% over the outer three-fifths of the thickness of the core layer. At the conclusion of the core laydown phase, a cladding soot layer about 0.9 cm in thickness, consisting of 14% $B_2O_3$ and 86% $SiO_2$ by weight, was applied.

Because the expansion coefficients of the inner core layers other than the first-deposited layer were higher than the cladding expansion coefficient, those inner core layers were in tension following cooling of the preform to ambient temperatures after soot deposition, and also following consolidation of the preform to a clear glass tubular preform. However, the first-deposited core layer was actually in a state of compression in both the soot and consolidated preforms having an expansion coefficient intermediate those of the cladding and inner core layers.

Figure 2:
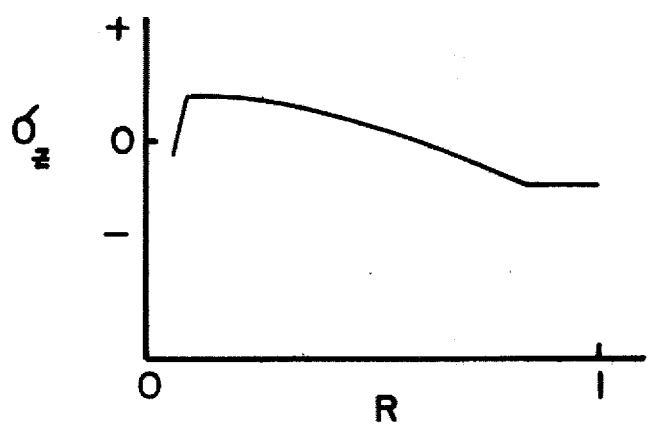
FIG. 2 is a schematic illustration of the radial variation of axial stress in a consolidated optical waveguide preform provided according to the invention.
Figure 3:
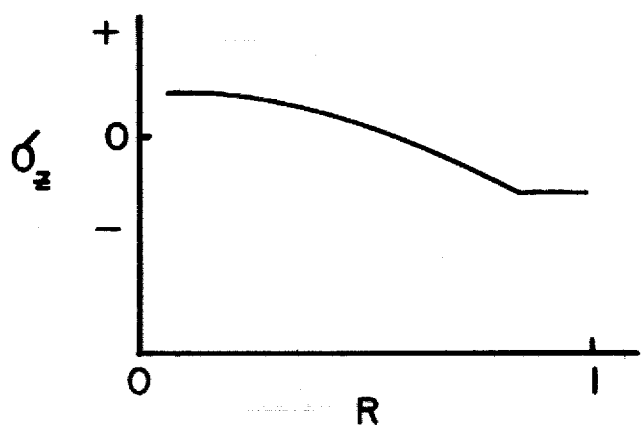
FIG. 3 is a schematic illustration of the radial variation of axial stress in a conventional consolidated optical waveguide preform provided in accordance with prior art.

The magnitude of the inner layer compressive stress was not measured, but is schematically illustrated by the plot of axial stress versus normalized preform radius R for typical consolidated preforms shown in FIG. 2 of the drawing. Axial stress $\sigma_z$ is shown on a relative scale, but reflects the compressive stress imparted to the innermost layer adjacent the preform center hole by virtue of the reduced expansion coefficient thereof. This stress characteristic contrasts markedly with the characteristic which would be exhibited by a conventionally profiled high-numerical-aperture consolidated waveguide blank not incorporating an inner compression layer, schematically illustrated in analogous fashion in FIG. 3 of the drawing.

Of six soot preforms started in accordance with the above described procedure, five were successfully deposited and all of these five were successfully removed from their starting members, dried to reduce the water content thereof from about 100–200 ppm to below 10 ppm, consolidated to clear glass tubular preforms, and drawn into optical waveguide filaments. Suitable methods for drying and consolidating such preforms are disclosed in U.S. Pat. No. 4,165,223, and that patent is expressly incorporated herein by reference for a description of these methods. The survival of the consolidated preforms in the high-stress interval between consolidation and drawing was favored by the presence of the inner compression layer in each of the preforms.

The optical waveguide filaments which were drawn from each of the dried and consolidated preforms had the following average performance characteristics:

| Numerical aperture | 0.278 |
| Attenuation (820 mm) | 4.2 dB/km |
| Outer Diameter | 125 μm |
| Core Diameter | 103 μm |
| Bandwidth (900 nm) | 191 mHz |

Of course, the foregoing example is merely illustrative of methods and preforms which could be provided in accordance with the invention as hereinabove described. It will thus be apparent that numerous variations and modifications of the above-described products and procedures could be resorted to within the scope of the appended claims.

I claim:

1. In the process for forming a substantially cylindrical optical waveguide preform having a radially varying composition and refractive index which comprises the step of successively applying to the exterior peripheral surface of a substantially cylindrical starting member first and subsequently applied core layers of vitreous soot of varying composition and refractive index, the layers proximate to the starting member containing higher concentrations of refractive-index-increasing dopants than the layers more distant therefrom and being in a state of tensile stress at ambient temperatures, the improvement wherein:

the tensile stress in the first-applied layer is reduced by modifying the composition of said layer during application to reduce the thermal expansion coefficient thereof to a value below that of at least one subsequently applied layer.

2. A process in accordance with claim 1 wherein the refractive-index-increasing dopant is selected from the group consisting of $GeO_2$, $P_2O_5$ and combinations thereof.

3. A process in accordance with claim 1 wherein the composition of the first-applied layer is modified by reducing the concentration of refractive-index-increasing dopants therein.

4. A process in accordance with claim 1 wherein the thermal expansion coefficient of the first applied layer is reduced to a value at which that layer is in a state of compression at ambient temperatures.

5. A process in accordance with claim 1 wherein the thickness of the first applied layer does not exceed about 3% of the total thickness of the core layers.

6. A cylindrical optical waveguide soot preform comprising a longitudinal center hole and a surrounding preform body comprising a core portion have a radially varying composition, the core portion being composed of a plurality of concentric core layers of vitreous soot including an inner layer defining the cylindrical surface of the longitudinal center hole and outer layers making up the remainder of the core portion, the soot layers proximate to the inner layer containing higher concentrations of refractive-index-increasing dopants than soot layers positioned exteriorly thereof, and being in a state of tensile stress at ambient temperatures, wherein, following soot deposition but prior to any treatment to remove residual water or consolidated the preform to clear glass, the inner layer defining the center hole of the preform has a thermal expansion coefficient lower than that of at least one of the layers proximate thereto, so as to exhibit a reduced level of tensile stress with respect to said proximate layer at ambient temperatures.

7. An optical waveguide preform in accordance with claim 6 wherein the refractive-index-increasing dopant is selected from the group consisting of $GeO_2$, $P_2O_5$ and combinations thereof.

8. An optical waveguide preform in accordance with claim 6 wherein the inner layer contains a lower concentration of refractive-index-increasing dopants than at least one of the layers proximate thereto.

9. An optical waveguide preform in accordance with claim 6 wherein the inner layer is in a state of compression at ambient temperatures.

10. An optical waveguide preform in accordance with claim 6 wherein the thickness of the first applied layer does not exceed about 3% of the total thickness of the core layers.

* * * * *